United States Patent
Park et al.

(10) Patent No.: US 10,576,556 B2
(45) Date of Patent: Mar. 3, 2020

(54) CUTTER DEVICE FOR PROCESSING DIFFICULT-TO-MACHINE MATERIAL

(71) Applicants: POSCO, Pohang-si, Gyeongsangbuk-do (KR); RESEARCH INSTITUTE OF INDUSTRIAL SCIENCE & TECHNOLOGY, Pohang-si, Gyeongsangbuk-do (KR)

(72) Inventors: Kwang Soo Park, Pohang-si (KR); Sook Hwan Kim, Pohang-si (KR)

(73) Assignees: POSCO, Pohang-si, Gyeongsangbuk-do (KR); Research Institute of Industrial Science and Technology, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 16/065,758

(22) PCT Filed: Dec. 21, 2016

(86) PCT No.: PCT/KR2016/015041
§ 371 (c)(1),
(2) Date: Jun. 22, 2018

(87) PCT Pub. No.: WO2017/111474
PCT Pub. Date: Jun. 29, 2017

(65) Prior Publication Data
US 2019/0009350 A1    Jan. 10, 2019

(30) Foreign Application Priority Data

Dec. 23, 2015 (KR) .......... 10-2015-0185434

(51) Int. Cl.
*B23C 5/00* (2006.01)
*B23C 5/24* (2006.01)

(52) U.S. Cl.
CPC .................. *B23C 5/2441* (2013.01)

(58) Field of Classification Search
CPC ....... B23C 5/2441; B23C 5/2437; B23C 5/24; B23C 5/2458; B23C 5/2484; B23C 2260/04; B23B 2260/146
See application file for complete search history.

(56) References Cited

U.S. PATENT DOCUMENTS 2,138,727 A * 11/1938 Cogsdill ............... B23C 5/2458
                                                    408/170
2,359,296 A    10/1944 Broga et al.
(Continued)

FOREIGN PATENT DOCUMENTS

CN         201338126 Y     11/2009
DE    10 2009 023 290 A1    2/2010
(Continued)

OTHER PUBLICATIONS

International Search Report dated Mar. 7, 2017 issued in International Patent Application No. PCT/KR2016/015041 (with English translation).
(Continued)

*Primary Examiner* — Willmon Fridie, Jr.
(74) *Attorney, Agent, or Firm* — Morgan, Lewis & Bockius LLP

(57) ABSTRACT

Provided is a cutter apparatus for machining a difficult-to-machine material, the cutter apparatus including: a cutting tool body which has a fastening portion formed at a center thereof; one or more cutters which are installed on the cutting tool body, and have superhard insert tips fixed to end portions thereof, respectively; and an angle adjusting unit which is installed in an internal space of the cutters, and adjusts angles of the cutters by spreading or retracting the cutters, so that angles of the cutters may be easily adjusted in accordance with a condition for cutting a difficult-to-machine material, in order to prevent damage to the super-
(Continued)

hard insert tips when machining a difficult-to-machine material having high hardness and high toughness.

8 Claims, 4 Drawing Sheets

(56) References Cited

U.S. PATENT DOCUMENTS

| | | | | |
|---|---|---|---|---|
| 2,712,686 | A * | 7/1955 | Heldt | B23B 29/03417 |
| | | | | 407/45 |
| 2,791,946 | A * | 5/1957 | Hewett | B23C 5/2489 |
| | | | | 82/12 |
| 3,371,397 | A * | 3/1968 | Scott | B23C 5/2226 |
| | | | | 407/36 |
| 3,380,137 | A * | 4/1968 | MacPetrie | B23B 29/03 |
| | | | | 407/110 |
| 3,664,755 | A * | 5/1972 | Carns | B23B 29/03421 |
| | | | | 166/55.7 |
| 10,183,347 | B2 * | 1/2019 | Serbutovsky | B23C 5/2458 |
| 2010/0272527 | A1 * | 10/2010 | Webb | B23B 27/141 |
| | | | | 407/118 |
| 2013/0084141 | A1 | 4/2013 | Bozkurt | |
| 2013/0343826 | A1 * | 12/2013 | Webb | B23B 27/148 |
| | | | | 407/118 |
| 2014/0186128 | A1 * | 7/2014 | Nedzlek | B23C 3/055 |
| | | | | 407/44 |
| 2015/0164527 | A1 * | 6/2015 | Maier | B23Q 15/10 |
| | | | | 700/160 |
| 2019/0118276 | A1 * | 4/2019 | Dubs | B23C 5/24 |

FOREIGN PATENT DOCUMENTS

| | | |
|---|---|---|
| GB | 191120949 A | 6/1912 |
| GB | 552973 A | 5/1943 |
| JP | S62-032719 U | 2/1987 |
| JP | 2002-120156 A | 4/2002 |
| JP | 3415111 B2 | 4/2002 |
| KR | 10-2007-0081779 A | 8/2007 |
| KR | 10-0919628 B1 | 9/2009 |
| KR | 10-2012-0043746 A | 5/2012 |
| KR | 10-2013-0130145 A | 12/2013 |
| KR | 10-2015-0058976 A | 5/2015 |
| KR | 10-2015-0068660 A | 6/2015 |
| KR | 10-1534441 B1 | 7/2015 |
| SU | 1537424 A1 | 1/1990 |

OTHER PUBLICATIONS

Office Action issued in corresponding Chinese Application No. 201680076155.0, dated Mar. 1, 2019.

* cited by examiner

CUTTER DEVICE FOR PROCESSING DIFFICULT-TO-MACHINE MATERIAL

CROSS REFERENCE

This patent application is the U.S. National Phase under 35 U.S.C. § 371 of International Application No. PCT/KR2016/015041, filed on Dec. 21, 2016, which claims the benefit of Korean Patent Application No. 10-2015-0185434, filed on Dec. 23, 2015, the entire contents of each are hereby incorporated by reference.

TECHNICAL FIELD

A cutter apparatus capable of machining a difficult-to-machine material is disclosed.

BACKGROUND ART

In general, in the case of a cutter for cutting a difficult-to-machine material such as Inconel, titanium, and high manganese steel, a superhard insert tip of the cutter is frequently damaged due to high hardness and high toughness of a material.

To solve the problem, superhard tool companies control the damage to the superhard tool by increasing toughness of the superhard tool itself by adjusting the amount of cobalt of the superhard tool or changing a cutting edge. However, this method is not an optimum solution for cutting a material having high hardness and high toughness.

In addition, even though one side of the superhard insert tip is abraded, the superhard insert tip may be used again four or more times by machining the other side thereof, but if the superhard insert tip is damaged, the damaged superhard insert tip needs to be immediately replaced with a new superhard insert tip.

DISCLOSURE

Technical Problem

The present invention has been made in an effort to provide a cutter apparatus for machining a difficult-to-machine material, which is capable of easily adjusting an angle of a cutter in accordance with a condition for cutting a difficult-to-machine material having high hardness and high toughness in order to prevent damage to a superhard insert tip when machining the difficult-to-machine material.

Technical Solution

An exemplary embodiment of the present invention provides a cutter apparatus for machining a difficult-to-machine material, the cutter apparatus including: a cutting tool body which has a fastening portion formed at a center thereof; one or more cutters which are installed on the cutting tool body, and have superhard insert tips fixed to end portions thereof, respectively; and an angle adjusting unit which is installed in an internal space of the cutters, and adjusts angles of the cutters by spreading or retracting the cutters.

The cutter may be rotatably installed on the cutting tool body by means of a hinge.

The angle adjusting unit may further include a wedge member which is installed between the cutters and adjusts the angles of the cutters in accordance with a vertical movement amount of the wedge member.

The wedge member may have a center hole formed at a central portion thereof.

The fastening portion of the cutting tool body may be provided as a screw fastening hole, and the angle adjusting unit may further include a fixing bolt which is screw-coupled to the screw fastening hole of the cutting tool body and installed to penetrate the center hole of the wedge member.

The fixing bolt may have a tool insertion groove formed at an end portion thereof for rotating the fixing bolt.

The fixing bolt may allow the wedge member to adjust the angles of the cutters by pressing the cutters by a rotation of the fixing bolt.

The wedge member may further include guide grooves which are formed in a side portion, which abuts the cutters, in a direction in which the wedge member is moved.

The cutter may further include a guide bar which is guided by being fitted into the guide groove of the wedge member.

One or more fixing pins may be inserted into the wedge member in a direction perpendicular to the fixing bolt, such that rotational force of the fixing bolt is transmitted to the wedge member.

Advantageous Effects

According to the present apparatus, it is possible to easily adjust cutting edge angles of the cutters by spreading the cutters outward by a simple operation, conveniently machine a difficult-to-machine material by adjusting the angles of the cutters, and prevent damage to the superhard tips when machining a difficult-to-machine material having high hardness and high toughness.

MODE FOR INVENTION

The technical terms used herein are merely for the purpose of describing a specific exemplary embodiment, and not intended to limit the present invention. Singular expressions used herein include plural expressions unless they have definitely opposite meanings. The terms "comprises" and/or "comprising" used in the specification specify particular features, regions, integers, steps, operations, elements, components, but do not preclude the presence or addition of other particular features, regions integers, steps, operations, elements, components, and/or groups thereof.

Hereinafter, an exemplary embodiment of the present invention will be described with reference to the accompanying drawings so that those skilled in the technical field to which the present invention pertains may carry out the exemplary embodiment. It can be easily understood by those skilled in the art to which the present invention pertains that the following exemplary embodiments may be modified to various forms without departing from the concept and the scope of the present invention. Accordingly, as those skilled in the art would realize, the described embodiments may be modified in various different ways, all without departing from the spirit or scope of the present invention.

Figure 1:
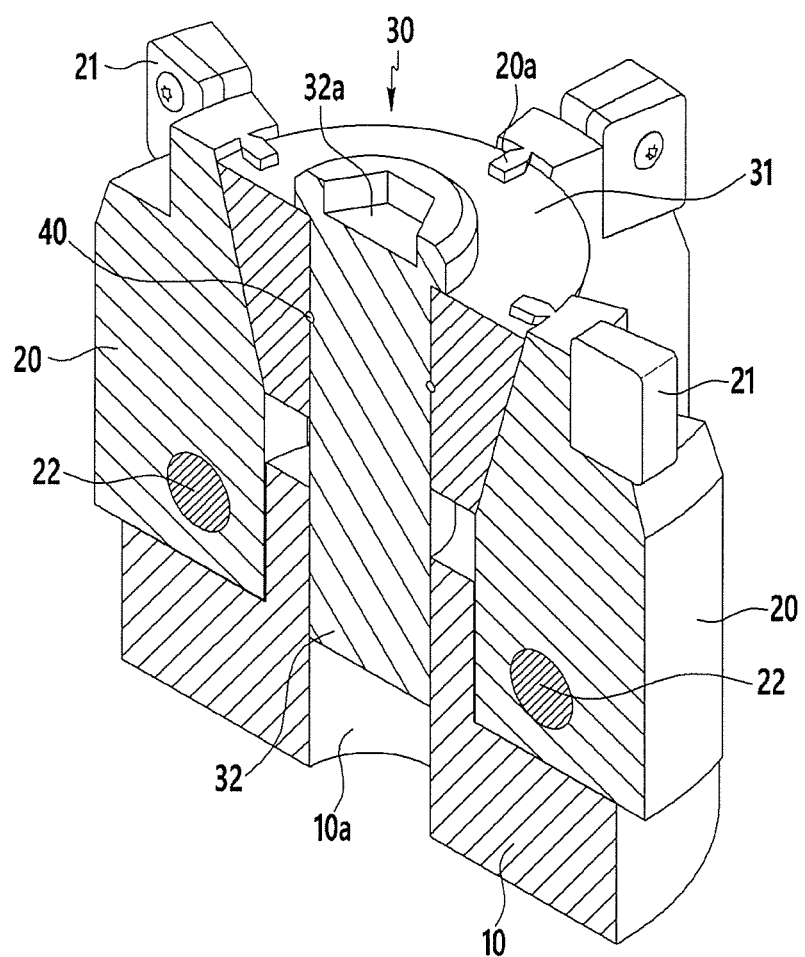
FIG. 1 is a view schematically illustrating a cutter apparatus for machining a difficult-to-machine material according to the present exemplary embodiment.

FIG. 1 is a view schematically illustrating a cutter apparatus for machining a difficult-to-machine material according to the present exemplary embodiment.

Figure 2:
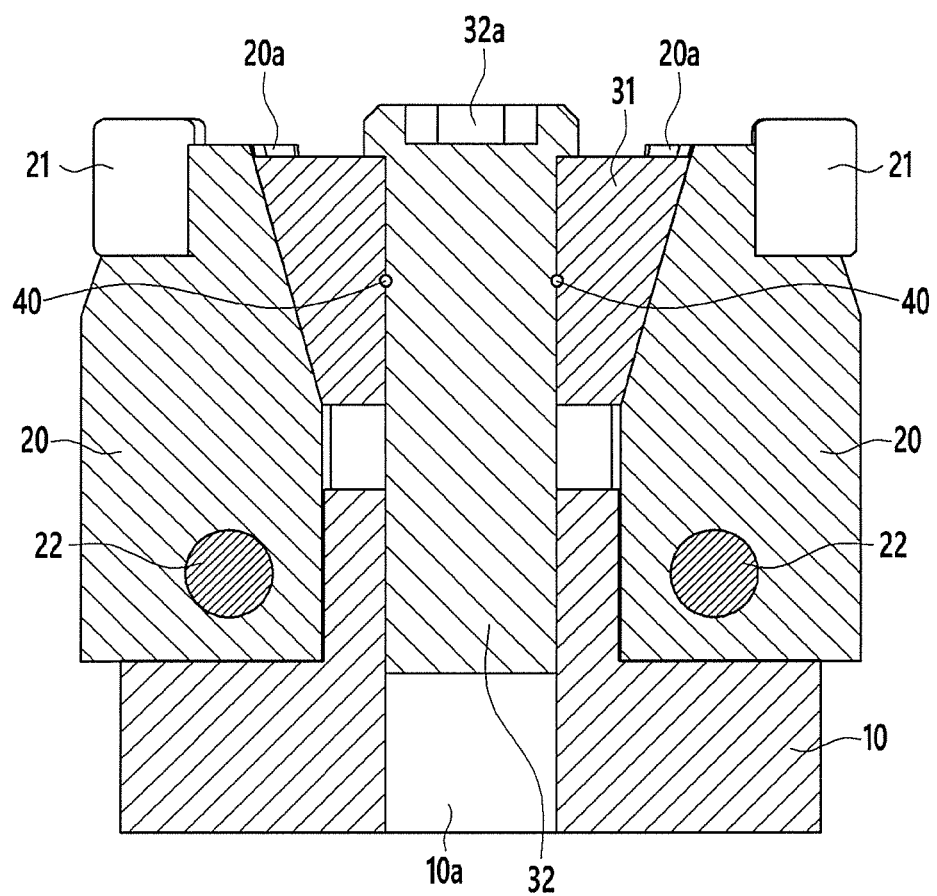
FIG. 2 is a view schematically illustrating a structure of the cutter apparatus for machining a difficult-to-machine material according to the present exemplary embodiment.

FIG. 2 is a view schematically illustrating a structure of the cutter apparatus for machining a difficult-to-machine material according to the present exemplary embodiment.

Figure 3:
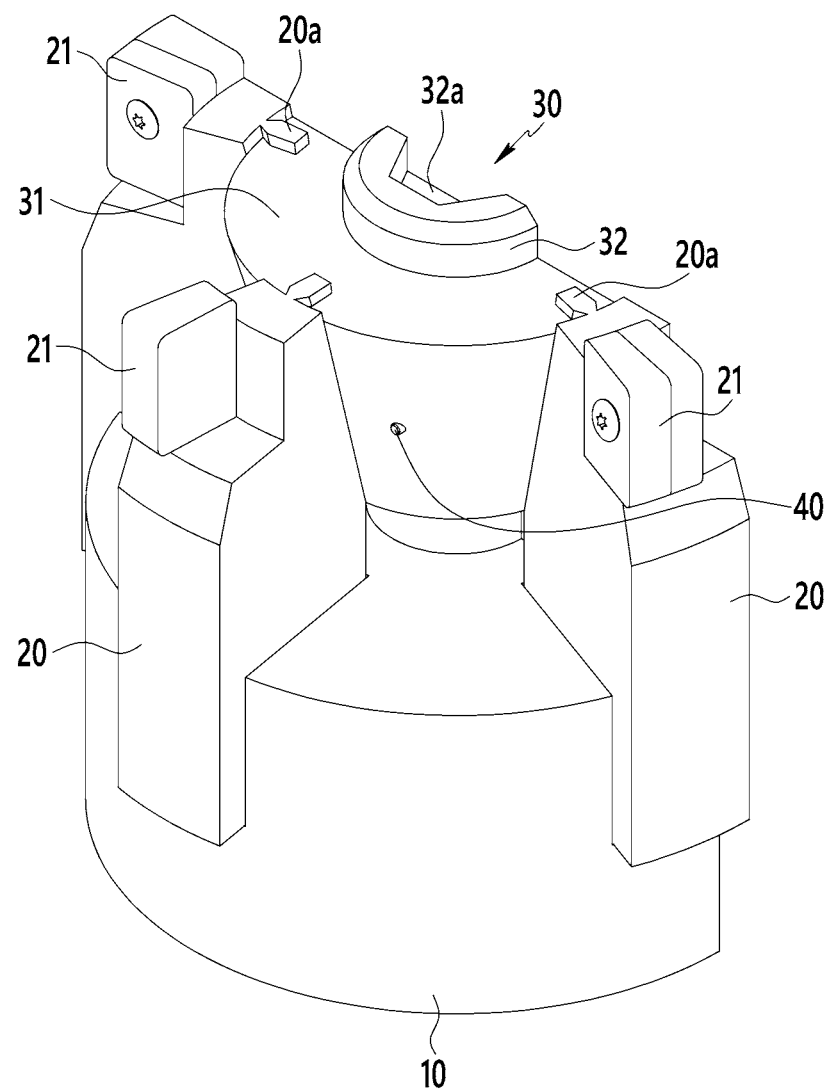
FIG. 3 is a view schematically illustrating an outer side of the cutter apparatus for machining a difficult-to-machine material according to the present exemplary embodiment.

FIG. 3 is a view schematically illustrating an outer side of the cutter apparatus for machining a difficult-to-machine material according to the present exemplary embodiment.

As illustrated in FIGS. 1 to 3, the cutter apparatus for machining a difficult-to-machine material according to the present exemplary embodiment includes a cutting tool body 10 which has a fastening portion formed at a center thereof, one or more cutters 20 which are installed on the cutting tool body 10 and have superhard insert tips 21 fixed to end portions thereof, respectively, and an angle adjusting unit 30 which is installed in an internal space of the cutter 20 and adjusts angles of the cutters 20 by spreading or retracting the cutters 20.

That is, the cutter apparatus for machining a difficult-to-machine material changes a cutting edge angle by adjusting an angle of the cutting superhard insert tip so as to allow the superhard insert tip to have an optimum cutting condition, and as a result, it is possible to conveniently use the superhard insert tip to machine a difficult-to-machine material.

The cutter is rotatably installed on the cutting tool body 10 by means of a hinge 22, such that the angle of the cutter 20 may be adjusted by an operation of the angle adjusting unit 30, and the angle of the superhard insert tip 21 fixed to the cutter 20 may be adjusted by the movement of the cutter 20.

Further, the angle adjusting unit 30 further includes a wedge member 31 which is installed between the cutters 20 and adjusts the angles of the cutters 20 in accordance with a vertical movement amount of the wedge member 31, and the wedge member 31 has a structure in which a center hole is formed at a central portion thereof.

The fastening portion of the cutting tool body is provided as a screw fastening hole 10a, and the angle adjusting unit 30 may further include a fixing bolt 32 which is screw-coupled to the screw fastening hole 10a of the cutting tool body 10 and installed to penetrate the center hole of the wedge member 31.

Here, the angle adjusting unit 30 includes the wedge member 31 and the fixing bolt 32, such that the wedge member 31 moves while coming into contact with the cutters 20 by a rotation of the fixing bolt 32, and the cutters 20 may be spread or retracted by the movement of the wedge member 31.

The fixing bolt 32 has a tool insertion groove 32a formed at an end portion thereof for rotating the fixing bolt 32, and the wedge member 31 may be moved by inserting a tool into the tool insertion groove 32a and rotating the fixing bolt 32.

That is, the fixing bolt 32 allows the wedge member 31 to adjust the angles of the cutters 20 by pressing the cutters 20 by the rotation of the fixing bolt 32, and for example, when the fixing bolt 32 is rotated in the forward direction by the tool, the wedge member 31 spreads the cutters 20 while moving in a direction toward the superhard insert tips 21 of the cutters 20, and on the contrary, when the fixing bolt 32 is rotated in the reverse direction by the tool, the wedge member 31 retracts the cutters 20 while moving in a direction toward the cutting tool body 10.

Figure 4:
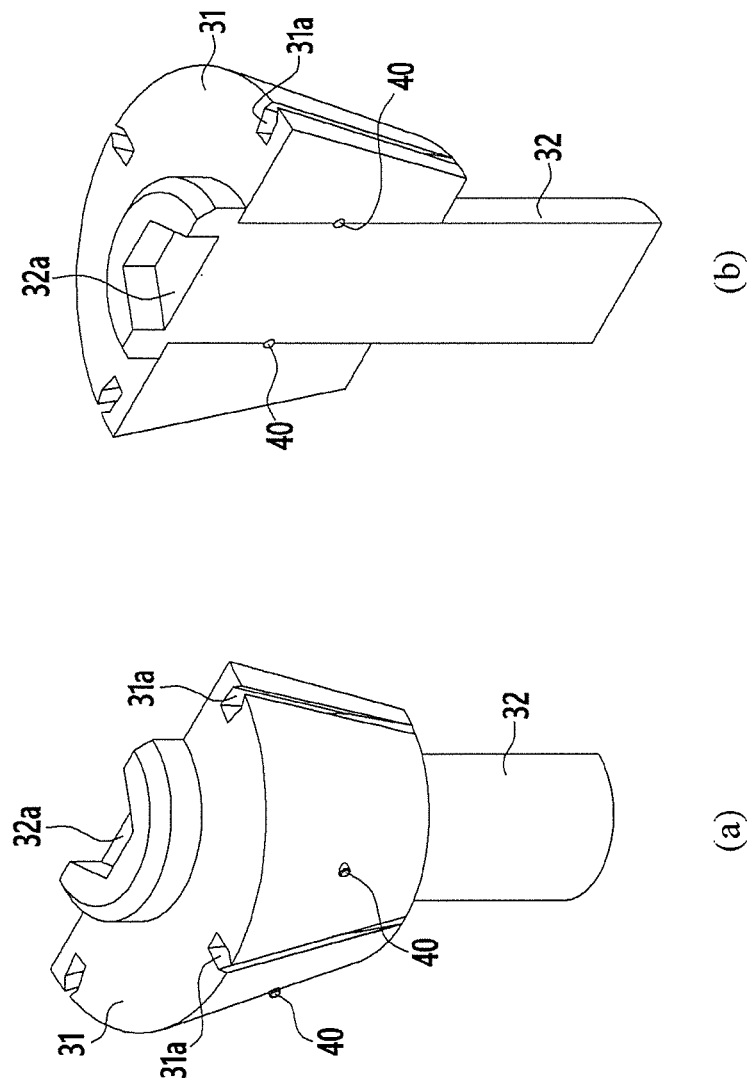
FIG. 4 is a view schematically illustrating an angle adjusting unit of the cutter apparatus for machining a difficult-to-machine material according to the present exemplary embodiment.

FIG. 4 is a view schematically illustrating an angle adjusting unit of the cutter apparatus for machining a difficult-to-machine material according to the present exemplary embodiment.

As illustrated in FIG. 4, the wedge member 31 further includes guide grooves 31a which are formed in a side portion, which abuts the cutters 20, in a direction in which the wedge member 31 is moved, and the cutters 20 may further include guide bars 20a, respectively, which are guided by being fitted into the guide grooves 31a of the wedge member 31.

Here, with the coupling between the guide bars 20a of the cutters 20 and the guide grooves 31a of the wedge member 31, the wedge member 31 is assembled to be slidable relative to the cutters 20, such that by the rotation of the fixing bolt 32, the wedge member 31 pushes the cutters 20 while sliding along the cutters 20, and thus the wedge member 31 presses the cutters 20, thereby spreading the cutters 20.

The cutter 20 is connected with the cutting tool body 10 through the hinge 22, such that the angle of the cutter 20 may be changed with respect to the cutting tool body 10.

One or more fixing pins 40 are inserted into the wedge member 31 in a direction perpendicular to the fixing bolt 32, such that rotational force of the fixing bolt 32 is transmitted to the wedge member 31. The wedge member 31 may be fixed in position by the fixing pin 40.

Therefore, it is possible to easily adjust cutting edge angles of the cutters 20 by spreading the cutters 20 outward by a simple operation, conveniently machine a difficult-to-machine material by adjusting the angles of the cutters 20, and prevent damage to the superhard insert tips 21 when machining a difficult-to-machine material having high hardness and high toughness.

While the exemplary embodiment of the present invention has been illustrated and described above, various modifications and other exemplary embodiments may be implemented by those skilled in the art. It is noted that all of the modifications and other exemplary embodiments are contemplated and included in the appended claims, and do not depart from the true purpose and the scope of the present invention.

<Description of symbols>

| | |
|---|---|
| 10: Cutting tool body | 10a: Screw fastening hole |
| 20: Cutter | 20a: Guide bar |
| 21: Superhard insert tip | 22: Hinge |
| 30: Angle adjusting unit | 31: Wedge member |
| 31a: Guide groove | 32: Fixing bolt |
| 32a: Tool insertion groove | 40: Fixing pin |

The invention claimed is:

1. A cutter apparatus for machining a difficult-to-machine material, the cutter apparatus comprising:
   a cutting tool body which has a fastening portion disposed at a center thereof;
   one or more cutters which are disposed on the cutting tool body, and have superhard insert tips fixed to end portions thereof, respectively; and
   an angle adjusting unit which is disposed in an internal space of the cutters, and adjusts angles of the cutters by spreading or retracting the cutters,
   wherein the angle adjusting unit includes a wedge member arranged between the cutters and adjusts the angles of the cutters in accordance with a vertical movement amount of the wedge member, and the wedge member further includes guide grooves which are disposed in a side portion thereof, which abuts the cutters, in a direction in which the wedge member moves.

2. The cutter apparatus of claim 1, wherein:

each of the cutters is rotatably disposed on the cutting tool body by means of a hinge.

3. The cutter apparatus of claim 1, wherein:

the wedge member has a center hole disposed at a central portion thereof.

4. The cutter apparatus of claim 3, wherein:

the fastening portion of the cutting tool body includes a screw fastening hole, and the angle adjusting unit further includes a fixing bolt which is screw-coupled to the screw fastening hole of the cutting tool body and installed to penetrate the center hole of the wedge member.

5. The cutter apparatus of claim 4, wherein:

the fixing bolt has a tool insertion groove disposed at an end portion thereof for rotating the fixing bolt.

6. The cutter apparatus of claim 4, wherein:

the fixing bolt allows the wedge member to adjust the angles of the cutters by pressing the cutters by a rotation of the fixing bolt.

7. The cutter apparatus of claim 1, wherein:

each of the cutters further includes a guide bar which is guided by being fitted into the guide groove of the wedge member.

8. The cutter apparatus of claim 4, wherein:

one or more fixing pins are inserted into the wedge member in a direction perpendicular to the fixing bolt, such that rotational force of the fixing bolt is transmitted to the wedge member.

* * * * *